United States Patent
Giannetti

(10) Patent No.: US 10,719,414 B2
(45) Date of Patent: Jul. 21, 2020

(54) ROLLBACK FOR CLOUD NATIVE WORKFLOWS

(71) Applicant: Cisco Technology, Inc., San Jose, CA (US)

(72) Inventor: Fabio Giannetti, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 15/977,231

(22) Filed: May 11, 2018

(65) Prior Publication Data

US 2019/0347168 A1  Nov. 14, 2019

(51) Int. Cl.
*G06F 11/00* (2006.01)
*G06F 11/14* (2006.01)
*G06F 9/48* (2006.01)

(52) U.S. Cl.
CPC .......... *G06F 11/1474* (2013.01); *G06F 9/485* (2013.01); *G06F 2201/805* (2013.01); *G06F 2201/82* (2013.01)

(58) Field of Classification Search
CPC ............. G06F 11/1474; G06F 11/1407; G06F 11/1402; G06F 11/141; G06F 16/215; G06F 16/2365; G06F 16/2379; G06F 16/2358; G06F 9/485; G06F 2201/805; G06F 2201/82; G06F 2201/80
See application file for complete search history.

(56) References Cited

U.S. PATENT DOCUMENTS

| 9,258,355 | B2 |  | 2/2016 | Chandra et al. |
| 9,942,306 | B2 | * | 4/2018 | Chandra ............... G06F 9/5038 |
| 10,277,488 | B2 | * | 4/2019 | Leff ..................... H04L 43/0823 |
| 10,503,726 | B2 | * | 12/2019 | Engstrand ........... G06F 16/2379 |

(Continued)

OTHER PUBLICATIONS

Baxter, Ryan., Using Microservices to Build Cloud Native Applications—Part 1, Cloud Zone, https://dzone.com/articles/using-microservices-to-build-cloud-native-applicat-1, 6 pages, 2015, DZone.

(Continued)

*Primary Examiner* — Marc Duncan
(74) *Attorney, Agent, or Firm* — Behmke Innovation Group LLC; James M. Behmke; Jonathon P. Western

(57) ABSTRACT

In one embodiment, a sequence of microservice steps may be performed according to a programmed microservice workflow, while determining which executed tasks within the performed sequence of microservice steps have an individually corresponding rollback defined within the particular task. As such, a rollback path is stored corresponding to reversing the sequence of those executed tasks having an individually corresponding rollback, and, for each executed task having an individually corresponding rollback, a current status of the microservice workflow is also stored as a respective rollback status within the rollback path. In response to detecting, during the performing, an error event at a particular multiservice step of the sequence of microservice steps, the rollback path may be executed by performing the individually corresponding rollback of each task having an individually corresponding rollback along the rollback path according to the respective rollback status, until either success or failure of the rollback path.

17 Claims, 12 Drawing Sheets

(56) References Cited

U.S. PATENT DOCUMENTS

| | | | |
|---|---|---|---|
| 2006/0294507 A1* | 12/2006 | Buskens | G06F 9/5066 |
| | | | 717/133 |
| 2013/0117238 A1* | 5/2013 | Gower | G06F 11/1474 |
| | | | 707/684 |
| 2018/0307514 A1* | 10/2018 | Koutyrine | G06F 9/45558 |
| 2019/0294504 A1* | 9/2019 | Giannetti | G06F 9/451 |
| 2019/0340059 A1* | 11/2019 | Bagarolo | G06F 11/0724 |

OTHER PUBLICATIONS

Prabhu, Nitin., "Effective Spring Transaction Management", Integration Zone, https://dzone.com/articles/spring-transaction-management, 2016, 11 pages, DZone.

"Cloud Native Application Development—A New Computing Paradigm", IT Strategy and Architecture from Oracle, Oracle White Paper, Feb. 2017, 22 pages, Oracle Corporation.

"Deployment Strategies for Cloud Native Applications", RealScale Architecture from Cloud 66, http://realscale.cloud66.com/deployment-strategies-for-cloud-native-applications/, 2017, 5 pages, RealScale Architecture from Cloud 66.

* cited by examiner

```
"X": {
    "Type": "Task",
    "Resource": "http://microserviceA/do",
    "Next": "Y",
    "Retry": [
        {
            "ErrorEquals": [ "ErrorA" , "ErrorB" ],
            "IntervalSeconds": 1,
            "BackoffRate": 2,
            "MaxAttempts": 2
        },
        {
            "ErrorEquals": [ "ErrorC" ],
            "IntervalSeconds": 5
        }
    ],
    "Catch": [
        {
            "ErrorEquals": [ "States.ALL" ],
            "Next": "Z"
        }
    ]
}
```

FIG. 3

```
{ "X": {
  "Type": "Task",
  "Resource": "http://microserviceA/do>",
  "Method": "HttpPost",
  "Next": "Y",
  "RollbackLabels": ["GoBigOrGoHome"],
  "Rollback": [ {
     "Resource": "http://microserviceA/do/<id>",
     "Method":  "HttpDelete"
     "Next": "RollbackSucceed",
     "Retry": [
       {
         "ErrorEquals": [ "Error1, Error2"],
         "IntervalSeconds": 1,
         "BackoffRate": 2,
         "MaxAttempts": 2
       },
       {
         "ErrorEquals": [ "Error3" ],
         "IntervalSeconds": 5
       }
     ],
     "Catch": [
       {
         "ErrorEquals": [ "States.ALL" ],
         "Next": "RollbackFailed"
       }
     ]
  }],
  "Catch": [
    {
      "ErrorEquals": [ "States.ALL" ],
      "Rollback": "GetOuttaHere" // Unhandled, will rollback everything and error the machine
    }
  ]
}}
```

FIG. 4A

```
{"Y": {
  "Type": "Task",
  "Resource": "http://microserviceB/data/<id>",
  "Method":  "HttpPut",
  "Next": "Z",
  "RollbackLabels": ["JustGoHome"],
  "Rollback": [
    {
      "Resource": "http://microserviceB/data/<id>",
      "Method":  "HttpPut",
      "Next": "RollbackSucceed",
      "Retry": [
        {
          "ErrorEquals": [ "Error1, Error2"],
          "IntervalSeconds": 1,
          "BackoffRate": 2,
          "MaxAttempts": 2
        },
        {
          "ErrorEquals": [ "Error3" ],
          "IntervalSeconds": 5
        }
      ]
    },
    "Catch": [
      {
        "ErrorEquals": [ "States.ALL" ],
        "Next": "RollbackFailed"
      }
    ]
  ],
  "Catch": [
    {
      "ErrorEquals": [ "States.ALL" ],
      "Rollback": "GetOuttaHere" // Unhandled, will rollback everything and error the machine
    }
  ]
}}
```

FIG. 4B

```
{"Z": {
  "Type": "Task",
  "Resource": "http://microserviceC/element/<id>",
  "Method":  "HttpPatch",
  "Rollback": [
    {
      "Resource": "http://microserviceC/element/<id>",
      "Method":  "HttpPatch",
      "Retry": [
        {
          "ErrorEquals": [ "Error1, Error2"],
          "IntervalSeconds": 1,
          "BackoffRate": 2,
          "MaxAttempts": 2
        },
        {
          "ErrorEquals": [ "Error3" ],
          "IntervalSeconds": 5
        }
      ]
    },
    "Catch": [
      {
        "ErrorEquals": [ "States.ALL" ],
        "Next": "RollbackFailed"
      }
    ]
  ],
  "Catch": [
    {
      "ErrorEquals": [ "States.1" ],
      "RollbackTo": "GoBigOrGoHome"
    },
    {
      "ErrorEquals": [ "States.2" ],
      "RollbackTo": "JustGoHome"
    }
  ]
}}
```

ROLLBACK FOR CLOUD NATIVE WORKFLOWS

TECHNICAL FIELD

The present disclosure relates generally to computer programming, and, more particularly, to rollbacks for microservice (e.g., cloud native) workflows.

BACKGROUND

Performing error handling in complex workflows is not trivial. Usually the workflow designer expresses all of the potential errors and describes the counter-actions and the new steps the workflow should progress in order to recover the error or move to an acceptable final state. Transaction "rollback" is generally understood in the art as an operation which returns a system (e.g., often a database) to some previous state. Rollbacks are important for system integrity, because they can restore a system/database to a clean copy even after erroneous operations are performed. For example, if a database server crashes, rolling back any transaction which was active at the time of the crash can restore the database to a consistent state. One example and well-known rollback technique in traditional databases is known as "ACID" (Atomicity, Consistency, Isolation, Durability), which is a set of properties of database transactions intended to guarantee validity even in the event of errors, power failures, etc.

As workflows become increasingly more complex, however, the number of combinations that need to be accounted for is also higher (e.g., path choices or parallel executions). Also, as workflows begin to leverage more microservices (e.g., cloud native workflows), the complexity of traditional rollback techniques can become an exacerbated pain point for programmers.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example try-catch programming construct;
FIGS. 4A-4C illustrate examples of microservice container codes having individually corresponding rollback commands.

DESCRIPTION OF EXAMPLE EMBODIMENTS

Overview

According to one or more embodiments of the disclosure, a sequence of microservice steps may be performed according to a programmed microservice workflow, where the techniques herein determine which executed tasks within the performed sequence of microservice steps have an individually corresponding rollback defined within the particular task. As such, a rollback path is stored corresponding to reversing the sequence of those executed tasks having an individually corresponding rollback, and, for each executed task having an individually corresponding rollback, a current status of the microservice workflow is also stored as a respective rollback status within the rollback path. In response to detecting, during the performing, an error event at a particular multiservice step of the sequence of microservice steps, the techniques herein may then execute the rollback path by performing the individually corresponding rollback of each task having an individually corresponding rollback along the rollback path according to the respective rollback status, until one of either success or failure of the rollback path.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Figure 1:
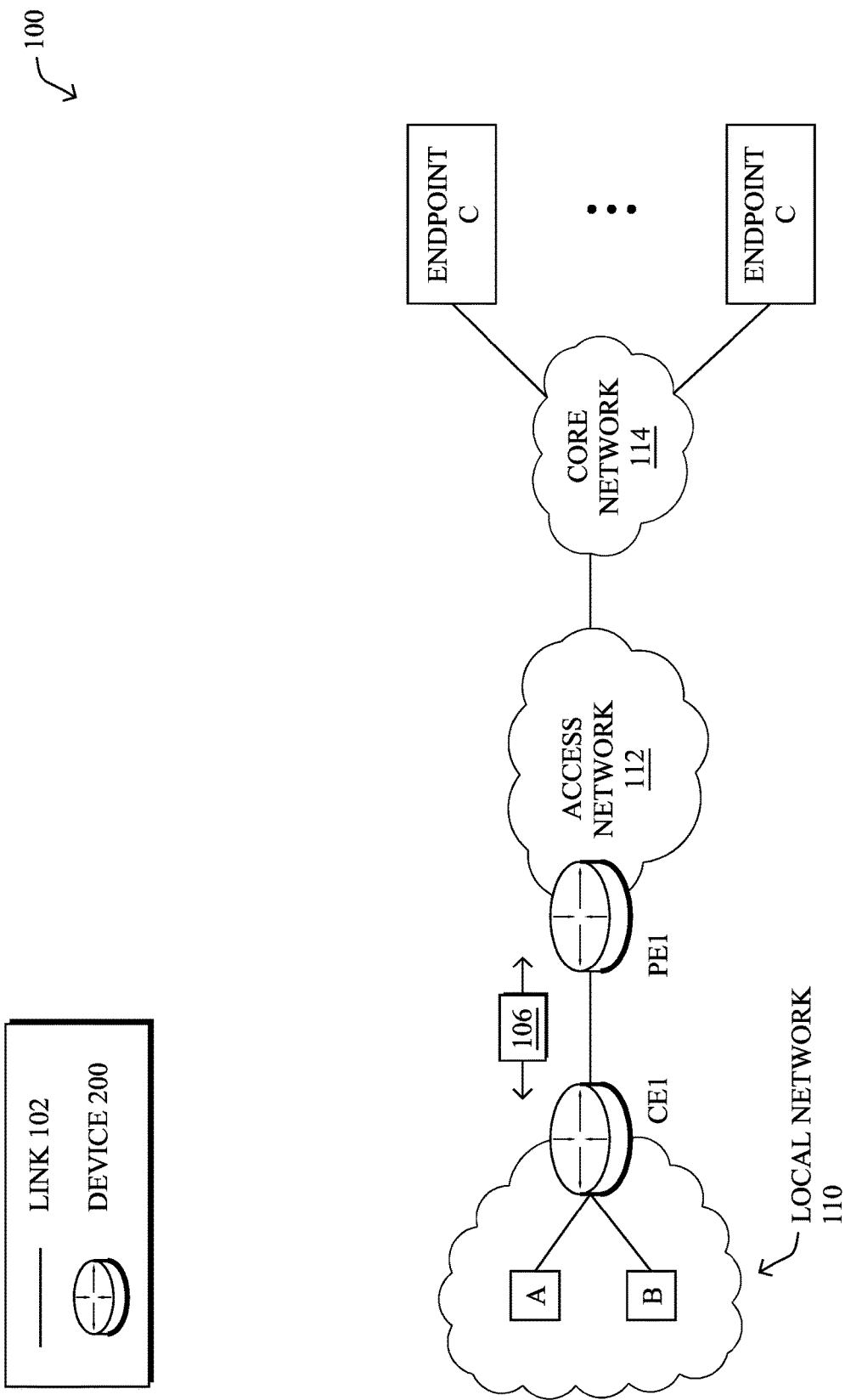
FIG. 1 illustrates an example computer network.

FIG. 1 is a schematic block diagram of an example simplified computer network 100 illustratively comprising nodes/devices 200, such as a plurality of computers, routers, servers, etc. interconnected by links and/or networks, as shown. For example, a customer edge (CE) router CE1 may interconnect devices "A" and "B" (e.g., computers or routers with computers connected to them) on a local network 110 with a provider edge (PE) router PE1 of an access network 112. In turn, access network 112 may provide local network 110 with connectivity to a core network 114, such as the Internet. From core network 114, any number of other endpoints "C" may be interconnected, such as servers, datacenters, databases, Internet of Things (IoT) networks, personal computers, workstations, and so on. For example, device A in local network 110 may be configured to access one or more remote "cloud" services via core network 114, as will be readily appreciated by those skilled in the art.

The various nodes/devices 200 may exchange data packets 106 (e.g., traffic/messages) via computer network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. As would be appreciated, links 102 may include any number of wired and/or wireless connections between devices. For example, device A may communicate wirelessly using a WiFi™ connection, device B may be connected via a wired Ethernet connection, CE1 may communicate to PE1 wirelessly using a cellular connection or else via a hardwired connection (e.g., DSL, cable, etc.), and so on.

Those skilled in the art will understand that any number of nodes, devices, links, etc. may be used in the computer network, and that the view shown herein is for simplicity. For example, while certain devices are depicted in FIG. 1, the view shown is a simplified view of computer network 100. In other words, communication network 100 may also include any number of intermediary networking devices such as, but not limited to, routers, switches, firewalls, etc., that are not shown.

Figure 2:
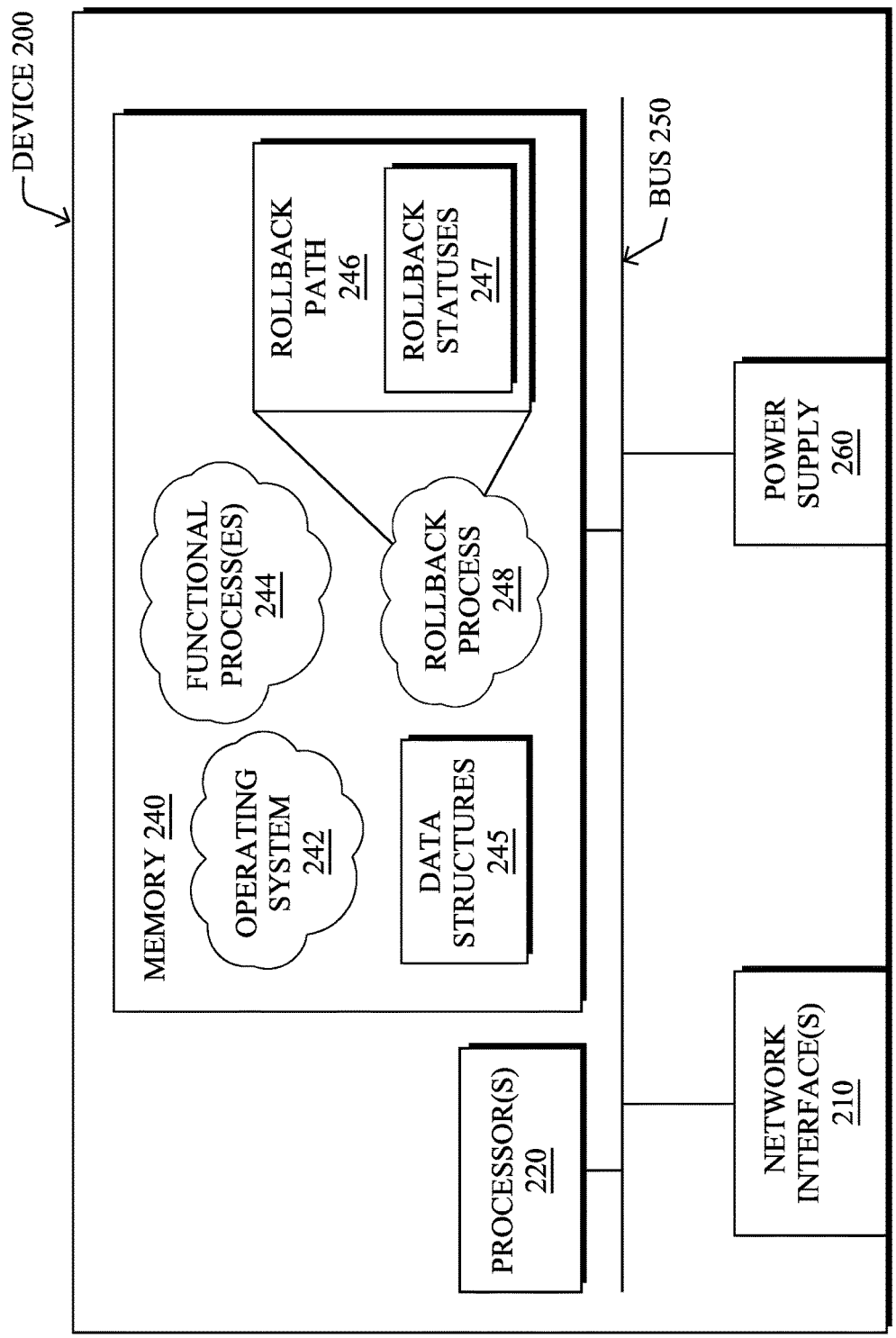
FIG. 2 illustrates an example computing device.

FIG. 2 is a schematic block diagram of an example computing device 200 that may be used with one or more embodiments described herein, e.g., as any of the computing devices shown in FIG. 1, or any other computing device referenced below. The device 200 may also be any other suitable type of device depending upon the type of computing environment. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical and/or wireless links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking operations in support of software processes and/or services executing on the device. These software processes and/or services may comprise an illustrative functional process 244 and an illustrative rollback process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, particularly functional process 244 and rollback process 248, those skilled in the art will appreciate that processes may be routines or modules within other processes, or may be functional operations of an operating system (e.g., executing processes/applications).

Functional process(es) 244 may include computer executable instructions executed by processor 220 to perform one or more specific functions of the device 200, such as one or more applications, programs, protocols, etc., as will be understood by those skilled in the art. For example, depending upon the configuration of the device, functional process 244 may be configured to perform specific functions corresponding to that configuration, such as a networking device (e.g., router, switch, firewall, etc.) performing networking operations (e.g., routing, switching, firewall operations, etc.), IoT nodes performing their specifically configured IoT functions, point of sale (PoS) devices performing PoS functions, a personal computer having specifically configured applications and associated functions, and so on.

Traditionally, applications were built as "monoliths", where the codebase included every feature and service that made up the application as a single (typically giant) collection of code, executed locally on a single device. Today, with microservices architecture, applications are being built as a distributed collection of services, which is more cohesive with the distributed nature of the cloud. "Cloud native", in particular, is an approach that builds software applications as microservices and runs them on a containerized and dynamically orchestrated platform to utilize the advantages of the cloud computing model. (Notably, the Cloud Native Computing Foundation hosts a number of open source projects that help run microservice apps, such as Kubernetes, Fluentd, Prometheus, and others).

A containerized platform generally means that each component (applications, processes, etc.) is packaged in its own container (a self-contained unit), with their own allotment of resources for computing, memory, and networking. The basic idea of containers is that everything needed to execute the software code is placed into one executable package. Microservices are based on the architectural style of implementing a system of multiple, relatively small applications, working together to provide the overall functionality of your system (a variant of the service-oriented architecture (SOA) architectural style). Each microservice realizes exactly one functionality, has a well-defined boundary and API, and may be gets developed and operated by a relatively small team. For example, a single medical office management application may comprise microservices corresponding to patient registration, credit card processing, doctor diagnosis entry, exams databases, and so on. Cloud native systems, therefore, containerize microservices, and orchestrate them into the workflows providing the overall desired functionality of an application.

———Rollbacks for Microservice Workflows———

As noted above, performing error handling in complex workflows is not trivial, where workflow designers express all of the potential errors and describe the counter-actions and the new steps the workflow should progress in order to recover the error or move to an acceptable final state. A "rollback", in particular, is the automatic or manual operation of restoring a system (e.g., database, device configuration, etc.) to a previous state by canceling or undoing a specific transaction or transaction set (refreshing any allocations of temporary states). As also noted above, however, workflows are becoming increasingly more complex, such as those leveraging more microservices (e.g., cloud native workflows). As such, the complexity of using traditional rollback techniques also increases to the point where programming a rollback process becomes unmanageable.

Said differently, rollbacks are not a trivial (or certain) thing when moving to cloud native architectures. In cloud native, a workflow is leveraging microservices which may have issues and/or are temporarily unavailable or otherwise producing inconsistent results (typical in an "eventual consistent" environment). That is, since containers themselves in a cloud native environment generally have no state, they need to be designed differently in terms of performing the task, as well as rolling back the task in the event of a failure somewhere along the workflow path. For example, a credit card transaction may be broken into obtaining account information, confirming the transaction amount, exchanging bank information, and so on, but if any one of those microservices fails, the information up to that point (at each of the respective cloud-based microservice servers) needs to be purged or otherwise reset. As another example, the network functions involved with initializing a cable modem require obtaining an IP address, advertising the address within various routing protocols, and other orchestration actions, but if a timeout occurs (e.g., losing connectivity, stalling, etc.), the state changes within the network up to that point no longer need to be stored or advertised, since resetting the cable modem will likely re-initialize the information differently. Designing the exception-handling rollback process for even these minimalistic processes require knowledge of the order in which the workflow completes, their interrelations, and exactly how to return to a previous state for each microservice container. This becomes even more difficult when individual containers are designed by different programmers/teams, and at the very least requires dedicated attention to programming the exception handling, taking resources away from programming the desired workflow.

The techniques herein, therefore, define a rollback capability that is very flexible and allows a cloud native designer to define a rollback for each individual step and to optionally consolidate rollbacks to a specific "break-point" in the workflow. Additionally, the techniques herein allow for simplifying the transformation of monolithic applications into microservices through cloud native workflows (or state machines) by making the microservices more generic and providing an automated transient state management as well as error handling and rollback.

Specifically, according to one or more embodiments of the disclosure as described in detail below, a sequence of microservice steps may be performed according to a programmed microservice workflow, where the techniques herein determine which executed tasks within the performed sequence of microservice steps have an individually corresponding rollback defined within the particular task. As such, a rollback path is stored corresponding to reversing the sequence of those executed tasks having an individually corresponding rollback, and, for each executed task having an individually corresponding rollback, a current status of the microservice workflow is also stored as a respective rollback status within the rollback path. In response to detecting, during the performing, an error event at a particular multiservice step of the sequence of microservice steps, the techniques herein may then execute the rollback path by performing the individually corresponding rollback of each task having an individually corresponding rollback along the rollback path according to the respective rollback status, until one of either success or failure of the rollback path. In one embodiment, rollback breakpoints may be defined such that execution of the rollback path is ceased (as a success) upon reaching such a rollback breakpoint along the rollback path.

Illustratively, the techniques described herein may be performed by hardware, software, and/or firmware, such as in accordance with the rollback process 248, which may include computer executable instructions executed by the processor 220 to perform functions relating to the techniques described herein, e.g., in conjunction with functional process 244 and/or operating system 242.

Notably, in a cloud native workflow operations that are not successful usually need to be recovered or resumed. Usually this is achieved using a try-catch type of construct or something similar, such as the code construct 300 illustrated in FIG. 3. For instance, a microservice task "X" traditionally defines a resource location (e.g., "http://microserviceA/do"), a subsequent step "Y", and various error states (and intervals, back-off rates, max attempts, etc.). A Catch is then defined for the task, but the issue with this approach is that for each potential Catch all of the possible operations and new states have to be defined. Based on where the rollback has to happen, this may require a substantially large if-then-else statement.

Operationally, therefore, the techniques herein add the possibility of creating a rollback operation for each task within a cloud native workflow, where the workflow discovers up to which step it has to roll back to (a "rollback breakpoint", allowing for certain things to be remembered if certain conditions are met), and then performs the corresponding rollback operations. FIGS. 4A-4C illustrate examples of microservice container codes 400-X, 400-Y, and 400-Z, for tasks X, Y, and Z, respectively, each having individually corresponding rollback commands according to one or more embodiments herein.

For instance, task X in 400-X, has a corresponding resource (e.g., "http://microserviceA/do"), with an "HttpPost" Method (for the service), and points to step Y as the next step in the sequence. The rollback, with label "GoBigOrGoHome", is defined within X to perform an HttpDelete method at the resource, continuing to either a success state or failure state for the rollback, as shown (e.g., with a Catch rollback "GetOuttaHere", such that unhandled errors rollback everything and error the machine). A similar programming strategy is followed for the next task Y in 400-Y, with its corresponding resource (e.g., "http://microserviceB/data/<id>"), an "HttpPut" Method (in the service and the rollback) and rollback label "JustGoHome" for its rollback. Lastly, in the next task Z in 400-Z, which also has its own a corresponding resource (e.g., "http://microserviceC/element/<id>"), and a Method of "HttpPatch", and defined rollback (with a Catch pointing to "GoBigOrGoHome" or "JustGoHome" from steps above, depending on various error states).

Based on the configuration of these three steps, the illustrative "X, Y, Z" workflow will execute X, where if X is successful the workflow engine will remember the current status and store it as rollback status, and will also start tracking the path the workflow takes and storing it into a rollback path ("Rollback.Path"). Once the workflow engine reaches Y, assuming it is also a successful step, the workflow will continue to Z. At this point, assume that Z fails because microserviceC is not responding. Accordingly, the rollback path is started to trace the steps in reverse order and essentially undo the tasks previously performed. Since Z has a rollback entry, this will be performed first, and if that is successful, then the workflow will track itself back to Y. Y has also a rollback entry, so that is also performed, and if that is successful, then the rollback path will roll back to X to perform the rollback there. If the rollback at X is successful, then the workflow will stop with the "RollbackSuccess" state (a special case of Success state), or if it cannot even recover the rollback, then it will fail with a "RollbackFail" (a special case of Fail state). In one embodiment, a report may be generated providing as output the current state versus the correct rollback state to indicate to a diagnostic application or administrator what states are still different after the attempted rollback.

Figure 5:
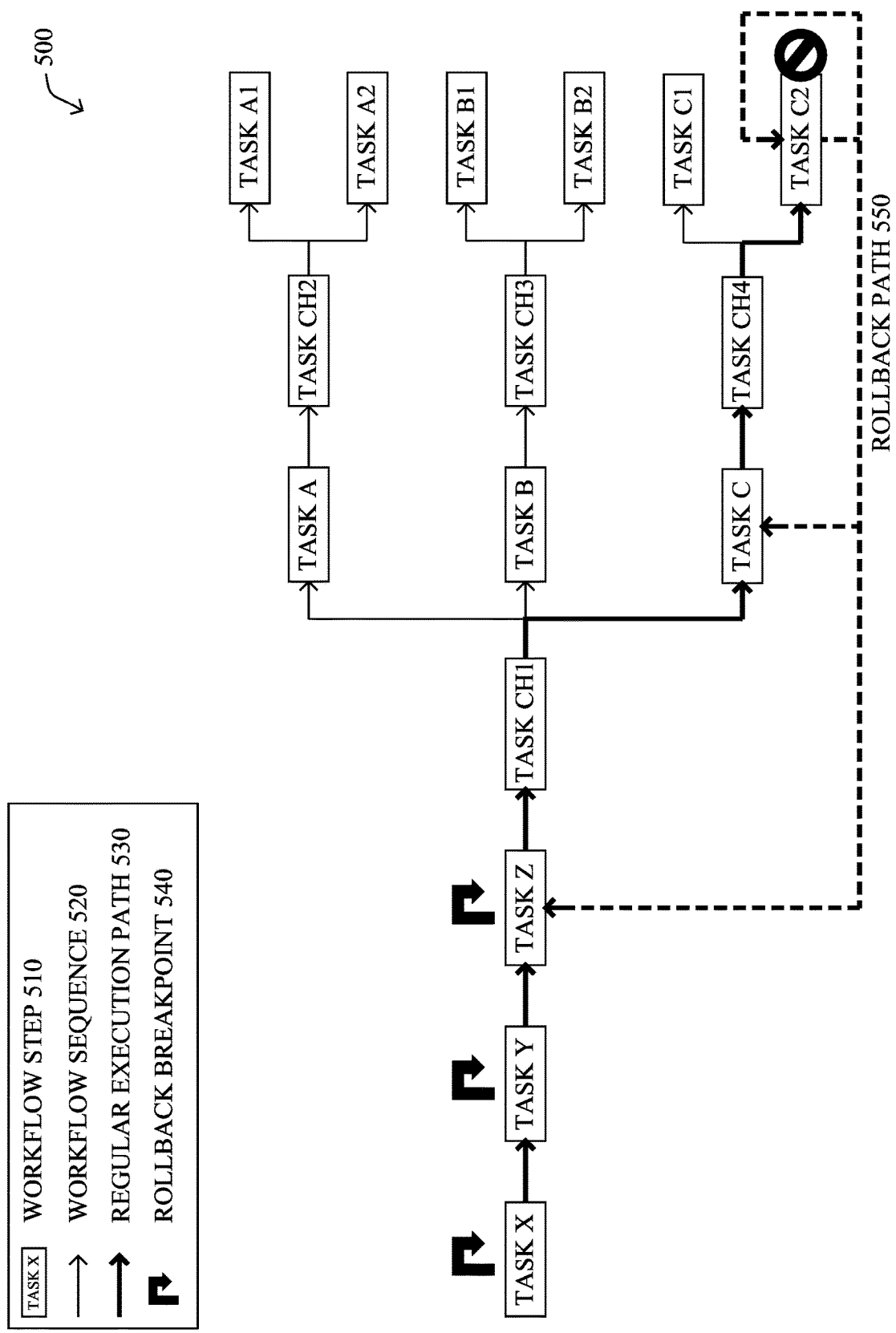
FIG. 5 illustrates an example of rollbacks for microservice workflows.

FIG. 5 visually illustrates a different scenario of a workflow 500 that has choices in it. The workflow itself has various steps 510 (e.g., tasks and choices or "CH" actions)

defining a particular workflow sequence 520, where an execution path 530 is the result of a particular performance of the workflow (e.g., performing task X, Y, Z, then choosing task C, then C2). In this case the designer has expressed three "rollback breakpoints" 540: one in Task X, one in Task Y, and one in Task Z. Assuming that the execution goes smoothly until Task C2 is reached, where at this point there is an irrecoverable error, then the workflow automatically executes the rollback path 550 (i.e., traversing back through, and performing rollbacks at, tasks C2 and C) back to Task Z, which is the last known rollback breakpoint that was successful.

Figure 6A:
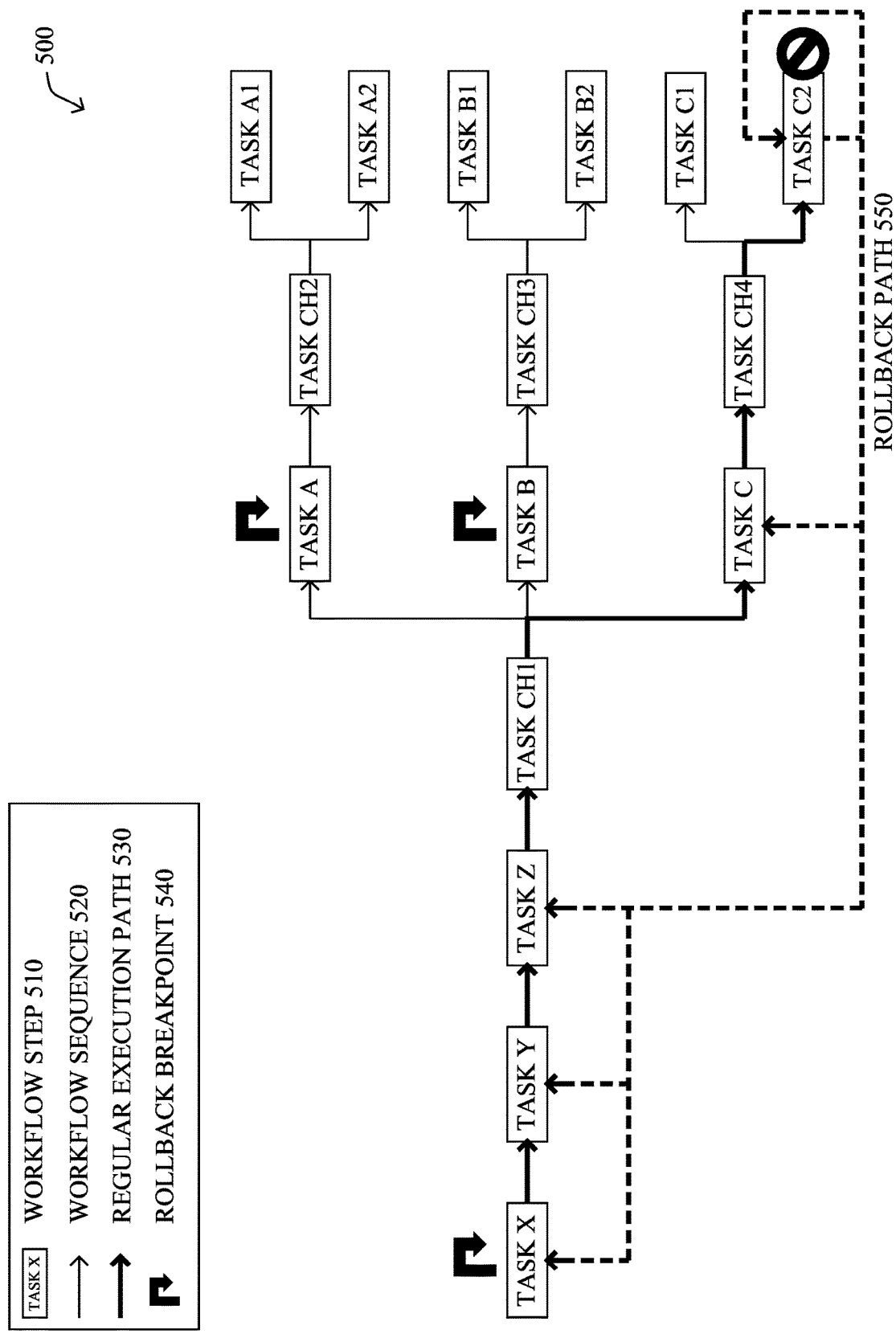
FIGS. 6A-6B illustrate another example of rollbacks for microservice workflows, particularly illustrating workflow branch-based rollback paths.
Figure 6B:
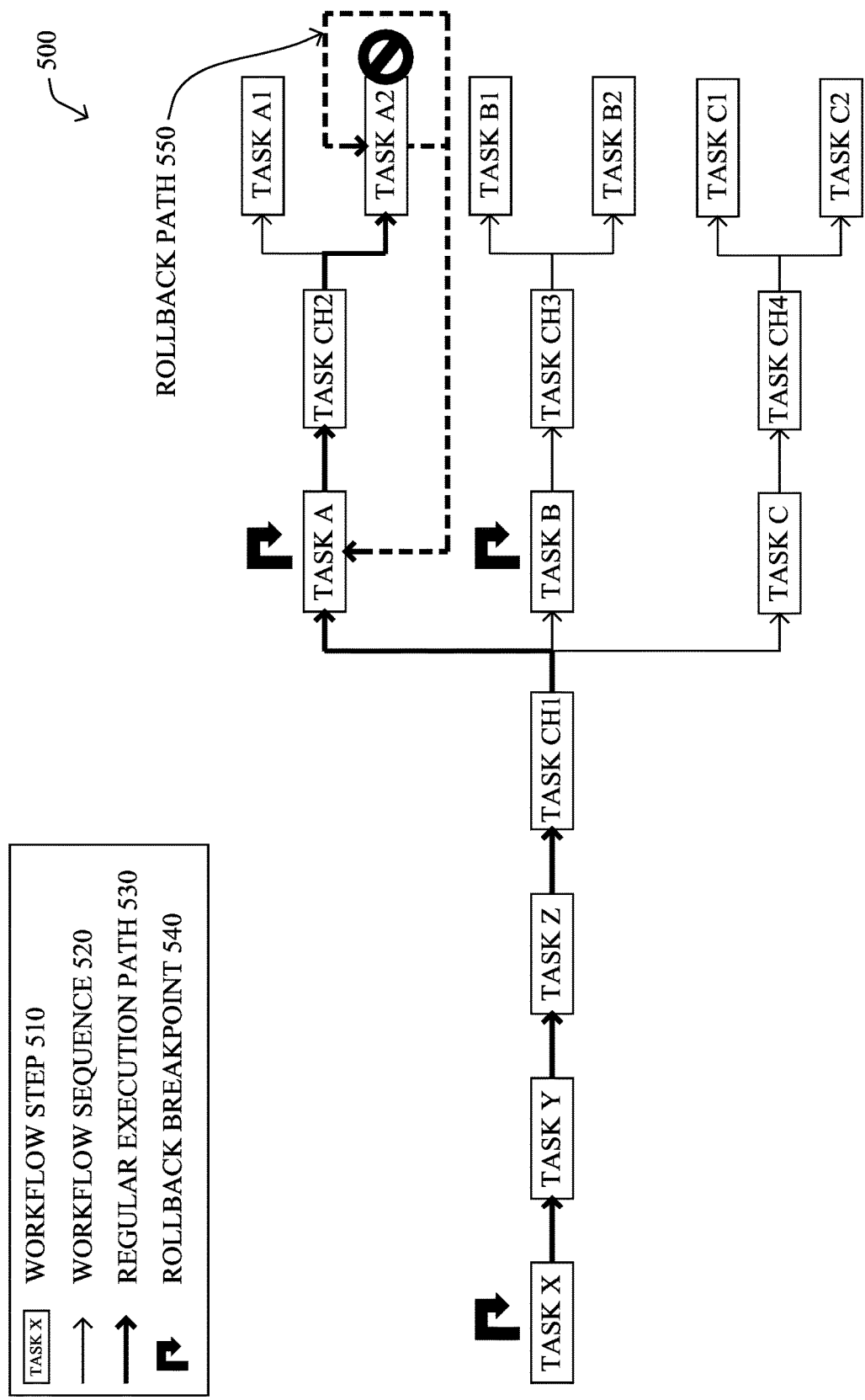

FIGS. 6A-6B illustrate another very typical example of defined rollback behavior available according to the embodiment herein. For instance, using the same workflow 500, the Task CH1 (choice 1) has two main branches (Task A and Task B) and a default one (Task C). If the default is performed, the designer has indicated through the rollback breakpoint on Task X and not on Task C that the intent is to roll back to the beginning (FIG. 6A). However, by having breakpoints on Task A and Task B, the intent is clear that if the workflow execution manages to reach any of the non-default tasks, that the information/results stored up to that point (Task A or B) are to be kept in the event of a downstream failure (FIG. 6B). Accordingly, the techniques herein would thus allow this configuration to take care of problems automatically depending on the branch the workflow is requesting to rollback to, and it will not require pre-defining all of the specific cases possible (e.g., at least 9 distinct rollback paths to be considered).

Figure 7A:
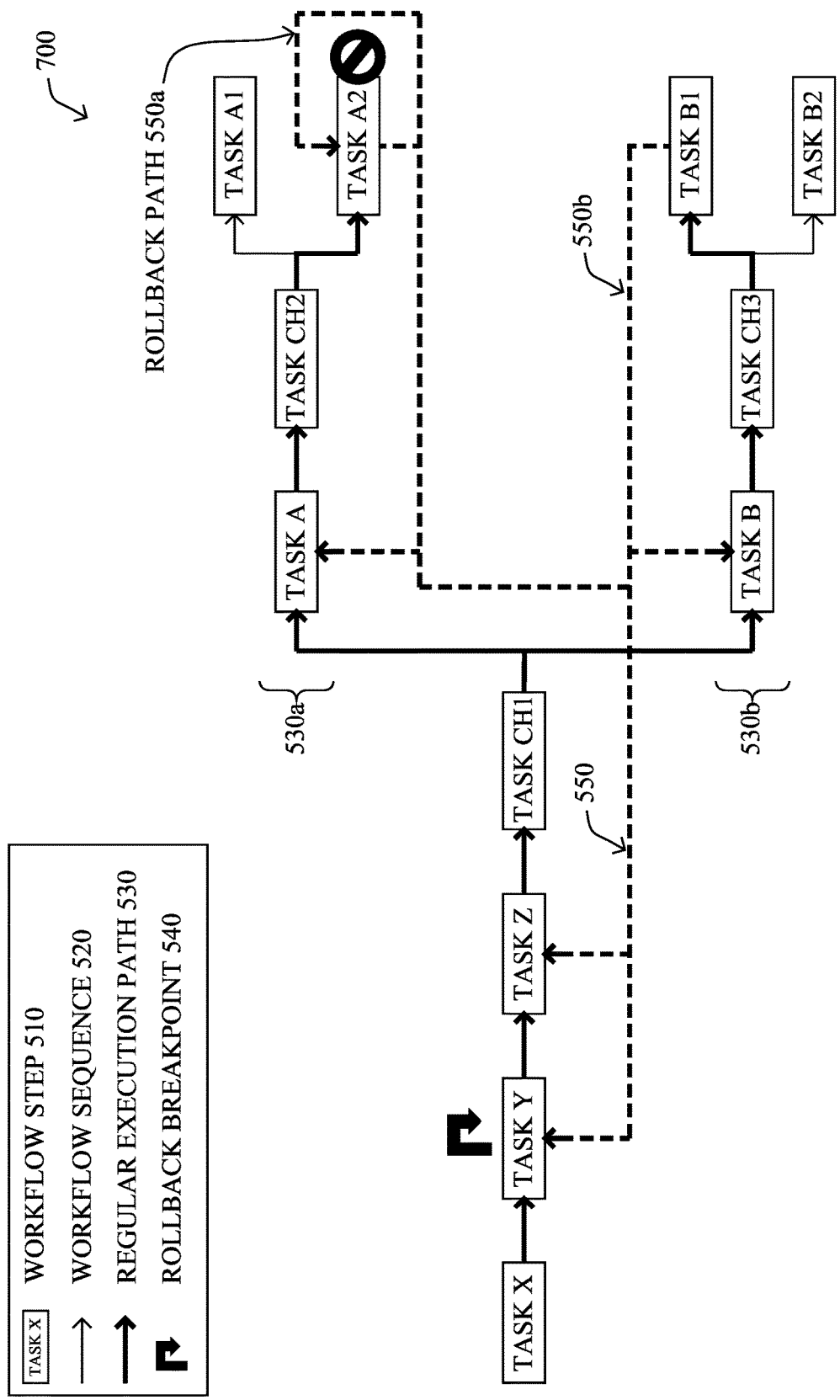
FIGS. 7A-7B illustrate another example of rollbacks for microservice workflows, particularly for handling portions of parallel execution within workflows.
Figure 7B:
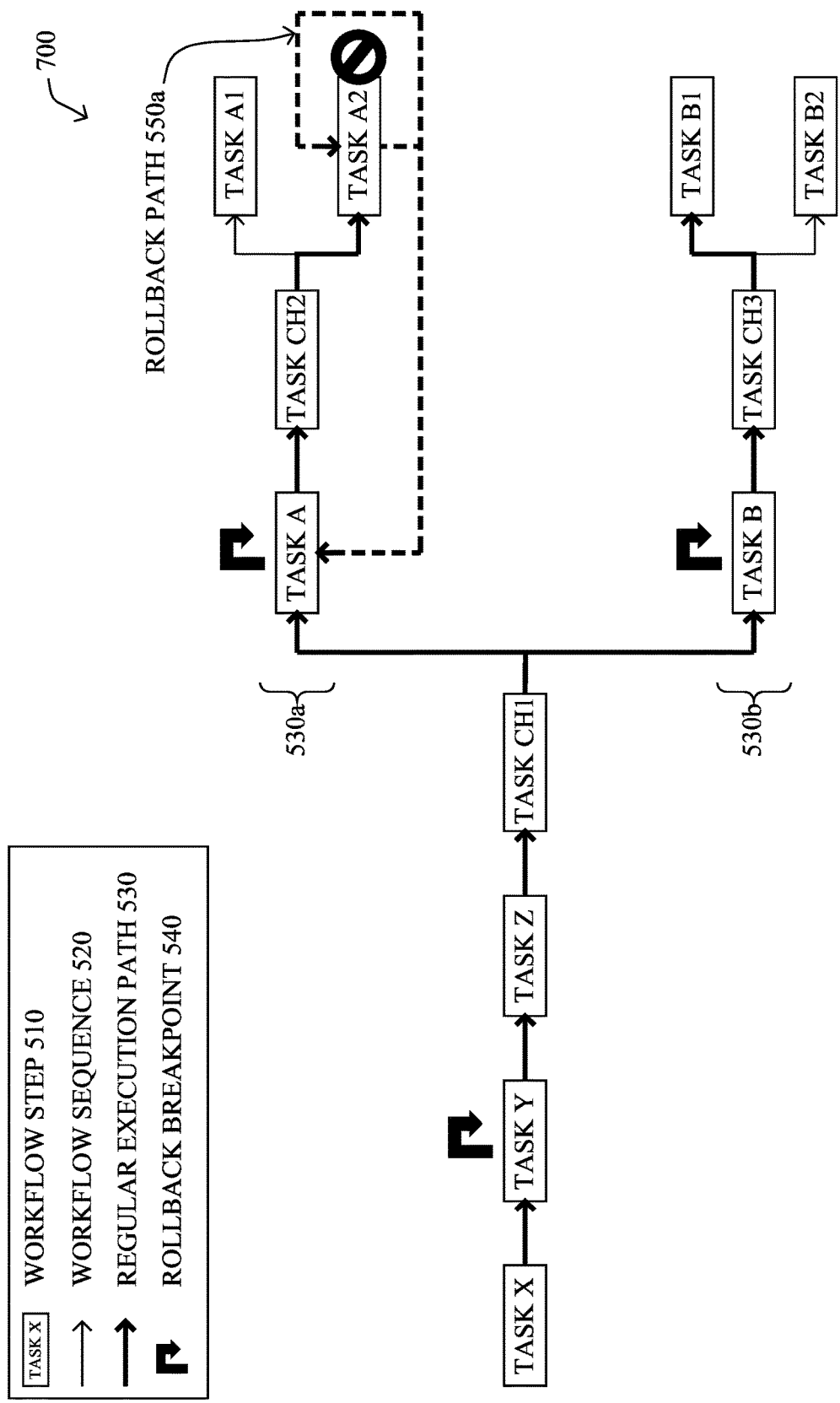

Note that there are instances where the workflow could result in a sequence of microservice steps that have one or more portions of parallel execution, such as illustrated in workflow 700 of FIGS. 7A and 7B. As such, a correspondingly built rollback path may also have one or more portions of parallel execution. For instance, as shown, the execution path 530 may comprise parallel portions 530a and 530b, which would then correspond rollback path parallel portions 550a and 550b, respectively. In one embodiment, as illustrated in FIG. 7A, all of the portions of parallel execution are performed on the rollback path (e.g., both 550a and 550b) in response to an error event occurring on any of the one or more portions of parallel execution within the sequence of microservice steps (e.g., on only portion 530a at Task A2). Conversely, depending upon configuration and/or coded rollback instructions, as illustrated in FIG. 7B, in response to the error event occurring on a particular one of the portions of parallel execution (e.g., on only portion 530a at Task A2), then the techniques herein may perform only a corresponding portion of parallel execution on the rollback path (e.g., only 550a, and not 550b). Different techniques may be used to dictate whether some or all of the parallel paths need to be rolled back, such as whether a breakpoint is defined before or after the divergence of the parallel execution paths, and the simplified examples shown herein are merely demonstrating particular aspects of the techniques herein.

Figure 8:
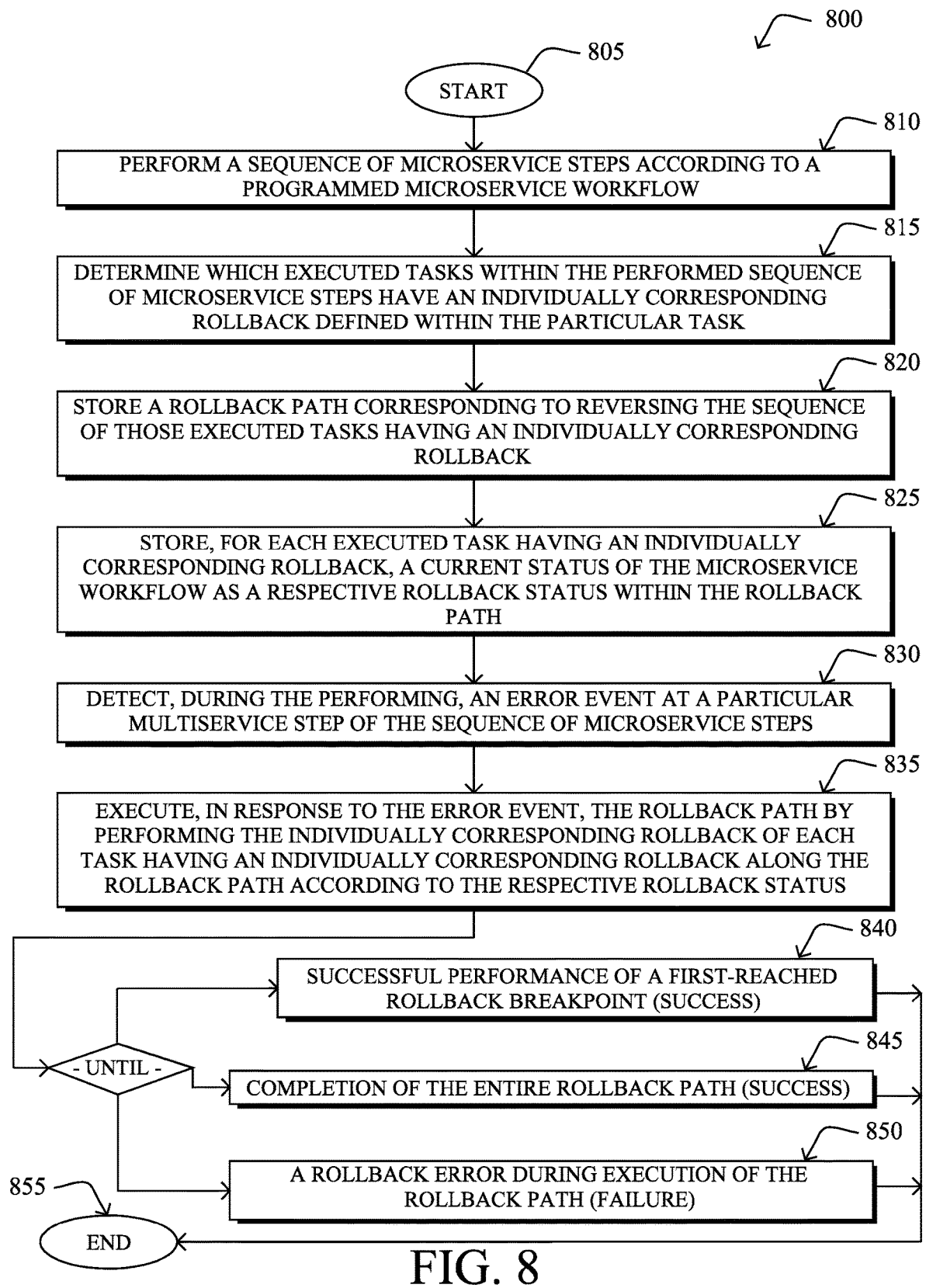
FIG. 8 illustrates an example simplified procedure for rollbacks for microservice workflows.

In closing, FIG. 8 illustrates an example simplified procedure for rollbacks for microservice (e.g., cloud native) workflows in accordance with one or more embodiments described herein. For example, a non-generic, specifically configured device (e.g., device 200 or processor 220 of device 200) may perform procedure 800 by executing stored instructions (e.g., rollback process 248). The procedure 800 may start at step 805, and continues to step 810, where, as described in greater detail above, a sequence of microservice steps may be performed according to a programmed microservice workflow (e.g., a cloud native workflow, a state-machine-based application, etc.). In step 815, the techniques herein determine which executed tasks within the performed sequence of microservice steps have an individually corresponding rollback defined within the particular task. Notably, individually corresponding rollbacks may each comprise a different rollback operation, such as undoing a particular task (to return to a respective rollback status), performing a different task (to reach a respective rollback status), and so on.

For executed tasks having an individually corresponding rollback, in step 820 the techniques herein store a rollback path 246 corresponding to reversing the sequence of those particular executed tasks. Also, in step 825, for each executed task having an individually corresponding rollback, a current status of the microservice workflow is stored as a respective rollback status 247 within the rollback path, accordingly.

In response to detecting an error event at a particular multiservice step of the sequence of microservice steps (during the performing) in step 830, then in step 835 the techniques herein execute the rollback path by performing the individually corresponding rollback of each task having an individually corresponding rollback along the rollback path according to the respective rollback status. (Note that as mentioned above, where there are multiple parallel paths, whether different, overlapping, or other arrangement, various rollback paths can be traversed as designed.)

In accordance with one or more embodiments herein, the rollback path may be executed until one of either success or failure of the rollback path, namely:

Step 840: When one or more particular tasks having an individually corresponding rollback define a rollback breakpoint, then execution of the rollback path may be ceased as a success of the rollback path upon successful performance of an individually corresponding rollback at a first-reached rollback breakpoint along the rollback path;

Step 845: Success of the rollback path occurs upon completion of the entire rollback path; or Step 850: In response to detecting a rollback error at a particular rollback during execution of the rollback path, execution of the rollback path ceases as a failure of the rollback path. (Note that in this instance, the techniques herein may also be configured to report a failed current state and a correct rollback state of the particular rollback in response to the failure of the rollback path, as mentioned above.)

The simplified example procedure 800 may then end in step 855. It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for rollbacks for microservice (e.g., cloud native) workflows. In particular, through rollbacks in general are known in the art, the current implementations of rollbacks are cumbersome for use with microservices or other containerized programming workflows. For instance, while current techniques require a programmer to design and implement a rollback strategy for an entire associated workflow, which can be tremendously complex and error-prone, the techniques herein allow for granularly defined and controlled rollbacks that are individually contained to both "do" and "undo" an operation, without the need to carry along a shared state. That is, assuming a workflow having tasks "A, B, C, . . . N", rather than requiring a rollback being defined and programmed for "N, . . . C, B, A", the techniques herein allow for programming A with a rollback for A, B with a rollback for B, C with a rollback for C, and so on. As such, when adjusting programming (e.g., removing B, adding step D, etc.), the adjustments also include the individually defined rollback operations, and require no further integration in order to allow for proper rollback operation of the workflow, thus simplifying the creation of microservice workflow program codes and associated rollback path management.

Traditional workflow and state machines have been generally monolithic (self-contained and independent), and unable to provide cloud native aspects or deep microservice integration and orchestrator integration that the solution described above can. The techniques herein, in particular, fully leverage cloud-based container services, have callback capabilities, and can perform the unique rollback solution as defined above that simplifies the conversion of monolithic applications to cloud native, as well as generally allowing for microservices to be more universal.

While there have been shown and described illustrative embodiments that provide for rollbacks for microservice workflows, it is to be understood that various other adaptations and modifications may be made within the spirit and scope of the embodiments herein. For example, while certain embodiments are described herein with respect specifically to cloud native programming, the techniques herein are not limited as such and may be used with other containerized programming environments, in other embodiments. Also, while certain programming code examples have been provided herein, such syntax, grammar, language, etc., is not meant to be limiting to the scope of the embodiments herein, and are merely illustrations to demonstrate various aspects of the techniques herein to those skilled in the art. In addition, while certain example applications may have been shown, other suitable implementations may be used, accordingly, such as applications for the Internet of Things (IoT) (e.g., distributed sensing/actuating), datacenters (e.g., virtual machine creation, allocation, management, data processing/storage, etc.), routing protocol applications (e.g., cable modems, routers, switches, firewalls), edge computing, fog computing, cloud computing, industrial (e.g., factory) networks, and so on.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    performing, by a processor, a sequence of microservice steps according to a programmed microservice workflow;
    determining, by the processor, which executed tasks within the performed sequence of microservice steps have an individually corresponding rollback defined within a particular task;
    storing, by the processor, a rollback path corresponding to reversing the sequence of those executed tasks having an individually corresponding rollback;
    storing, by the processor, for each executed task having an individually corresponding rollback, a current status of the microservice workflow as a respective rollback status within the rollback path;
    detecting, by the processor during the performing, an error event at a particular multiservice step of the sequence of microservice steps;
    executing, by the processor in response to the error event, the rollback path by performing the individually corresponding rollback of each task having an individually corresponding rollback along the rollback path according to the respective rollback status, until one of either success or failure of the rollback path, wherein one or more particular tasks having an individually corresponding rollback define a rollback breakpoint; and
    ceasing, by the processor, execution of the rollback path as success of the rollback path upon successful performance of an individually corresponding rollback at a first-reached rollback breakpoint along the rollback path.

2. The method as in claim 1, wherein success of the rollback path occurs upon completion of the entire rollback path.

3. The method as in claim 1, further comprising:
    detecting a rollback error at a particular rollback during execution of the rollback path; and
    in response, ceasing execution of the rollback path as a failure of the rollback path.

4. The method as in claim 3, further comprising:
    reporting a failed current state and a correct rollback state of the particular rollback in response to the failure of the rollback path.

5. The method as in claim 1, wherein the microservice workflow is a cloud native workflow.

6. The method as in claim 1, wherein individually corresponding rollbacks are selected from a group consisting of:
    undoing a particular task to return to a respective rollback status; and
    performing a different task to reach a respective rollback status.

7. The method as in claim 1, wherein the programmed microservice workflow comprises a state-machine-based application.

8. The method as in claim 1, wherein the sequence of microservice steps comprises one or more portions of parallel execution, and wherein the rollback path correspondingly has one or more portions of parallel execution.

9. The method as in claim 8, further comprising:
    performing all of the one or more portions of parallel execution on the rollback path in response to the error event occurring on any of the one or more portions of parallel execution within the sequence of microservice steps.

10. The method as in claim 8, further comprising:
    in response to the error event occurring on a particular one of the one or more portions of parallel execution within the sequence of microservice steps, performing only a corresponding portion of parallel execution on the rollback path.

11. A tangible, non-transitory, computer-readable medium storing program instructions that cause a computer to execute a process comprising:
- performing a sequence of microservice steps according to a programmed microservice workflow;
- determining which executed tasks within the performed sequence of microservice steps have an individually corresponding rollback defined within a particular task;
- storing a rollback path corresponding to reversing the sequence of those executed tasks having an individually corresponding rollback;
- storing, for each executed task having an individually corresponding rollback, a current status of the microservice workflow as a respective rollback status within the rollback path;
- detecting, during the performing, an error event at a particular multiservice step of the sequence of microservice steps; and
- executing, in response to the error event, the rollback path by performing the individually corresponding rollback of each task having an individually corresponding rollback along the rollback path according to the respective rollback status, until one of either success or failure of the rollback path, wherein one or more particular tasks having an individually corresponding rollback define a rollback breakpoint; and
- ceasing execution of the rollback path as success of the rollback path upon successful performance of an individually corresponding rollback at a first-reached rollback breakpoint along the rollback path.

12. The computer-readable medium as in claim 11, wherein success of the rollback path occurs upon completion of the entire rollback path.

13. The computer-readable medium as in claim 11, wherein the process further comprises:
- detecting a rollback error at a particular rollback during execution of the rollback path; and
- in response, ceasing execution of the rollback path as a failure of the rollback path.

14. The computer-readable medium as in claim 13, wherein the process further comprises:
- reporting a failed current state and a correct rollback state of the particular rollback in response to the failure of the rollback path.

15. The computer-readable medium as in claim 11, wherein the microservice workflow is a cloud native workflow.

16. An apparatus, comprising:
- a processor configured to execute one or more processes; and
- a memory configured to store the one or more processes executable by the processor, the one or more processes, when executed by the processor, are configured to:
  - perform a sequence of microservice steps according to a programmed microservice workflow;
  - determine which executed tasks within the performed sequence of microservice steps have an individually corresponding rollback defined within a particular task;
  - store a rollback path corresponding to reversing the sequence of those executed tasks having an individually corresponding rollback;
  - store, for each executed task having an individually corresponding rollback, a current status of the microservice workflow as a respective rollback status within the rollback path;
  - detect, during the performing, an error event at a particular multiservice step of the sequence of microservice steps; and
  - execute, in response to the error event, the rollback path by performing the individually corresponding rollback of each task having an individually corresponding rollback along the rollback path according to the respective rollback status, until one of either success or failure of the rollback path, wherein one or more particular tasks having an individually corresponding rollback define a rollback breakpoint; and
  - cease execution of the rollback path as success of the rollback path upon successful performance of an individually corresponding rollback at a first-reached rollback breakpoint along the rollback path.

17. The apparatus as in claim 16, wherein the process when executed is further configured to:
- detect a rollback error at a particular rollback during execution of the rollback path; and, in response cease execution of the rollback path as a failure of the rollback path; and
- report a failed current state and a correct rollback state of the particular rollback in response to the failure of the rollback path.

* * * * *